(12) United States Patent
Gella et al.

(10) Patent No.: US 8,504,979 B2
(45) Date of Patent: Aug. 6, 2013

(54) APPLICATION FRAMEWORK FOR REACTIVE INFORMATION PROPAGATION AND PLANNING FOR LIFELIKE EXERCISES

(75) Inventors: Kamal V. Gella, Johnstown, PA (US); David R. Hockenberry, Friedens, PA (US); Donald May, Johnstown, PA (US); Jeremy Snyder, Johnstown, PA (US); Natarajan Sridhar, Windber, PA (US); Laurie Waisel, Cleveland, OH (US); John Wass, Addison, PA (US)

(73) Assignee: Concurrent Technologies Corporation, Johnstown, PA (US)

( * ) Notice: Subject to any disclaimer, the term of this patent is extended or adjusted under 35 U.S.C. 154(b) by 824 days.

(21) Appl. No.: 12/718,133

(22) Filed: Mar. 5, 2010

(65) Prior Publication Data

US 2010/0229149 A1    Sep. 9, 2010

Related U.S. Application Data

(60) Provisional application No. 61/158,096, filed on Mar. 6, 2009.

(51) Int. Cl.
*G06F 9/44*    (2006.01)

(52) U.S. Cl.
USPC ............................................. 717/101; 717/120

(58) Field of Classification Search
USPC ............... 717/100, 101, 102, 104, 108, 120, 717/121, 123; 707/702
See application file for complete search history.

(56) References Cited

U.S. PATENT DOCUMENTS

| | | | | |
|---|---|---|---|---|
| 6,633,878 B1 * | 10/2003 | Underwood | ......................... | 1/1 |
| 7,302,436 B2 * | 11/2007 | Qubti et al. | ......................... | 1/1 |
| 8,327,318 B2 * | 12/2012 | Chaar et al. | ................... | 717/102 |
| 2007/0174810 A1 * | 7/2007 | Hockenberry et al. | ....... | 717/101 |

* cited by examiner

*Primary Examiner* — Usmaan Saeed
*Assistant Examiner* — MD. I Uddin
(74) *Attorney, Agent, or Firm* — Buchanan Ingersoll & Rooney PC

(57) ABSTRACT

The present invention addresses the development of software applications for multiple domains and users. The application framework of the present invention includes a collection of mutually compatible software components, technologies and capabilities that can be assembled using object-oriented techniques to build custom software applications.

3 Claims, 16 Drawing Sheets

APPLICATION FRAMEWORK FOR REACTIVE INFORMATION PROPAGATION AND PLANNING FOR LIFELIKE EXERCISES

CROSS-REFERENCE TO RELATED APPLICATIONS

This application claims the benefit of Provisional Patent Application Ser. No. 61/158,096 entitled "RIPPLE Application Framework", filed on Mar. 6, 2009, the entire disclosure of which is incorporated by reference herein.

FIELD OF THE INVENTION

The present invention is directed toward an application framework which includes a collection of mutually-compatible software components, technologies and capabilities that can be assembled utilizing object-oriented techniques to build custom software applications and, more particularly, custom software applications in multiple domains including, but not limited to, Command and Control ("C2"), Combat Planning and Operations, Situational Awareness, Decision Support and Human Terrain Mapping. The value of the present invention is in automating task planning, execution and conducting after action reviews ("AARs") in full-spectrum military operations and exercises spanning major combat operations (e.g., in general war conditions), irregular warfare (e.g., in insurgency conditions), peace operations and limited intervention (e.g., during unstable peace conditions), and peacetime military engagement (e.g., during stable peace conditions).

BACKGROUND OF THE INVENTION

The current state of the art in the pertinent technology (including commercial, Government and research software systems) offers specialized solutions for addressing specific aspects of Command and Control ("C2"), Exercise Planning and Operations, Situational Awareness, Decision Support or Human Terrain Mapping. For example:

- The Command Post of the Future ("CPOF") tool offers battalion commanders an executive level decision support system providing situational awareness and collaborative tools to support decision making.
- TiGRNET helps brigades share pictures, text and maps of what soldiers are observing while on patrol to enhance tactical level situational awareness.
- The Army's Distributed Common Ground Systems ("DCGS-A") is the Army's primary system for tasking, processing, correlating, integrating, exploiting, and disseminating (Intelligence, Surveillance, and Reconnaissance) assets and information. The DCGS-A enables the ground commander to access multiple sources of data, information, and intelligence, and facilitates development of situational understanding by allowing the commander to visualize, analyze, and understand the threat and environment, predict threat intentions, execute targeting, conduct ISR integration, and support information operations.
- The Joint Master Scenario Event List ("JMSEL") is an automated system specifically designed to assist in Master Scenario Event List ("MSEL") management. The MSEL is a collection of pre-scripted events intended to guide an exercise toward specific outcomes. The JMSEL tool facilitates the work of Exercise Planners and supports execution of exercises with simple, easy to use functions.
- AXIS PRO (Analysis and eXploration of Information Sources Professional) enables intelligence analysts to find data of interest, organize and refine the results, and then visualize the results and detect patterns. Its capabilities include link, temporal, pattern and geospatial analysis tools, net-centric alarm and alerts, entity and relationship extraction from text documents, and an integrated web portal for information searching and sharing.

Currently, similar technologies do not address the breadth and depth of the effort required in planning, executing and conducting after action reviews ("AARs") of tasks in full-spectrum military operations spanning Insurgency Operations, Civil Military Affairs, Information Operations, and Capacity Building. In particular, the technologies currently available have one or more of the following limitations:

Highly Specialized: The current state of the art systems address specific aspects of Command and Control ("C2"), Combat Planning and Operations, Situational Awareness, Decision Support or Human Terrain Mapping, and do not exploit the commonality inherent across these domains. Consequently, the military is forced to use multiple tools to enable planning, executing and conducting after-action-reviews in modern full-spectrum operations.

Stovepipe Architectures: The current state of the art systems typically do not easily interface with one another, and are built on heterogeneous computing platforms. This increases effort and time involved with using these tools in tandem with one another. In an environment where their operational configuration and capabilities are being constantly upgraded, issues of configuration management and information assurance further degrade the value of these "stovepipe" solutions.

Incomplete Echelon Support: The current state of the art systems typically provide strongest support at a specific military echelon. For example, CPOF is focused at the battalion level, whereas TIGRNet is focused at the individual war fighter/company level.

Lack of Full Spectrum Support: Today's military is forced to operate in a complex global environment marked by persistent conflict that requires capabilities for full spectrum operations. The current state of the art systems provide strongest support for a specific type of conflict. For example, CPOF provides excellent support for conventional combat operations (force of force) in general war conditions, but is of limited value in irregular warfare (insurgency conditions), peace operations, limited intervention (during unstable peace conditions), and peacetime military engagement (during stable peace conditions). The value of TiGRNET and AXIS PRO are complementary to CPOFs.

The present invention is directed toward overcoming one or more of the above-identified problems.

The present invention provides one information framework that combines and links a variety of data related to tasks, events, timelines, human terrain, imagery, maps, social networks and more, to enable automating task planning, execution and conducting after action reviews ("AARs") in full-spectrum military operations and exercises spanning major combat operations (e.g., in general war conditions), irregular warfare (e.g., in insurgency conditions), peace operations and limited intervention (e.g., during unstable peace conditions), and peacetime military engagement (e.g., during stable peace conditions). The present invention accomplishes this by using an event-driven data architecture that is linked with and driven by events as they occur during a military operation or exercise. For instance, local citizenry are linked to scenario events (e.g., smuggling, kidnapping, IED attacks, etc.), locations (e.g., home, work, etc.), organizations (e.g., business, criminal, social, municipal, insurgent, etc.), as well as other citizenry (e.g., social network, etc.). This enables changes to the data model to be automatically triggered by events, and the changes to then be automatically propagated across the entire data model using links.

For example, the stopping of a truck driver role player who is carrying fertilizer could result in the disruption of an IED, thus making an event, which in turn could prevent loss of life among local citizenry caused by the planned IED attack. This can further manifest at a macro level as a favorable change in the attitude of the local citizenry towards US forces. The present invention enables such complex social and demographic behavior to be modeled using an event-driven, linked data model, and it supports capabilities for managing and visualizing this information (using a variety of devices such as, but not limited to, flowcharts, organization charts, Gantt charts, social network diagrams, geographical information overlaid on maps and satellite imagery, etc.) to enhance Command and Control ("C2"), Planning and Operations, Situational Awareness, and Decision Support.

The present invention also has tremendous potential in applications to non-military operations involving, for example, civil disaster relief efforts, pandemic tracking and control, and law enforcement, to name just a few. Sample scenarios have been developed for tracking of the H1N1 virus for the Centers for Disease Control, and training for Mexican Police Officers for the U.S. Department of State.

SUMMARY OF THE INVENTION

The present invention addresses the development of software applications for multiple domains and users. The application framework of the present invention includes a collection of mutually compatible software components, technologies and capabilities that can be assembled using object-oriented techniques to build custom software applications in multiple domains including, but not limited to, Command and Control ("C2"), Combat Planning and Operations, Situational Awareness, Decision Support and Human Terrain Mapping. The value of the present invention is in automating task planning, execution and conducting after action reviews "AARs") in full-spectrum military operations and exercises spanning major combat operations (e.g., in general war conditions), irregular warfare (e.g., in insurgency conditions), peace operations and limited intervention (e.g., during unstable peace conditions), and peacetime military engagement (e.g., during stable peace conditions).

The uniqueness of the present invention can be summarized in terms of the following key features:

(1) multiple-spectrum operations model; and
(2) plug-in architecture.

The multiple-spectrum operations model of the present invention includes software components, technologies and capabilities that are organized into layered modules which are applicable across a wide spectrum of operations in multiple domains. These include, but are not limited to, Command and Control ("C2"), Combat Planning and Operations, Situational Awareness, Decision Support, Human Terrain Mapping, etc. To enhance the sophistication of the inventive application framework, each of the layered modules operates in an integrated data mode. The integrated data mode operates such that as the data in the model changes, the application framework components ensure that these changes "ripple" throughout the model and manifest in each module in predefined, specific ways.

The plug-in architecture feature of the present invention involves designing the application framework as a "plug-in" architecture, which enhances the flexibility of the application framework towards creating software applications for multiple domains and/or users, such as, but not limited to, those described above. Design of the application framework as a plug-in architecture provides improved support for customization and extensibility of any system built using the application framework. Customization is generally accomplished by enabling select application framework components (e.g., modules or sub-modules) which best suit the needs of the specific application being developed.

It is an object of the present invention to provide an application framework which includes various layered modules and/or sub-modules that can be assembled using object-oriented techniques to build custom software applications.

It is a further object of the present invention to provide such an application framework as a plug-in architecture.

Other objects, aspects and advantages of the present invention can be obtained from a study of the specification, the drawings, and the appended claims.

and also used to organize other data within that association (e.g., master). This inventive application framework technique allows changes to be made to master concepts, such as demographic associations, within the context of a particular association, and prevents those changes from leaving the scope of that association.

DETAILED DESCRIPTION OF THE INVENTION

Figure 1:
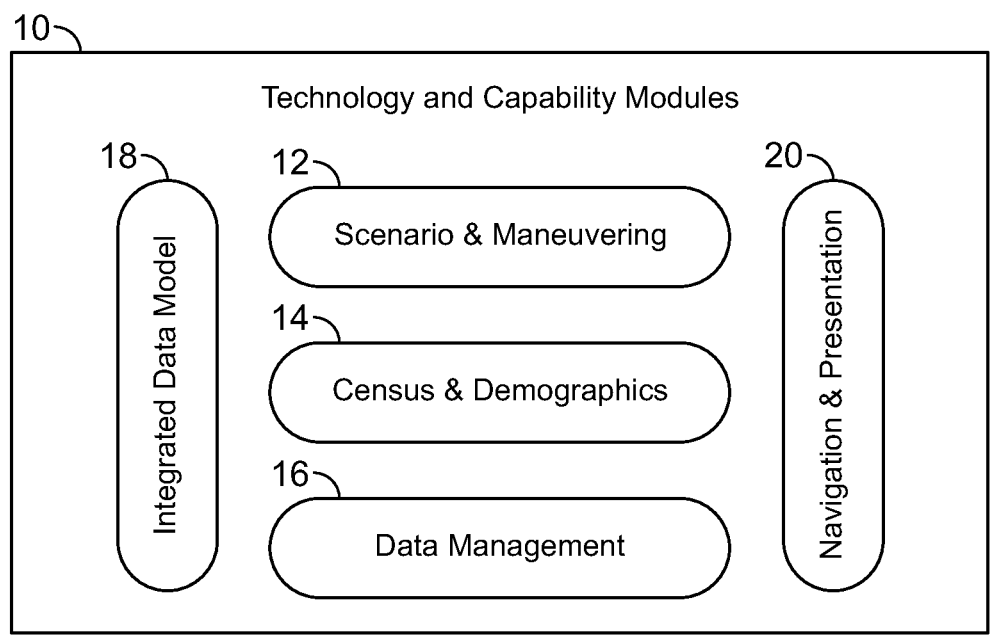
FIG. 1 is an architectural diagram illustrating the various layered modules of the application framework of the present invention.

FIG. 1 illustrates an architectural diagram of the inventive application framework, shown generally at 10. The inventive application framework includes at least one computer device having at least one memory and at least one processing unit operatively connected to the at least one memory. The application framework is composed of various modules (e.g., technology and capability modules), including a scenario and maneuvering module 12, a census and demographics module 14, a data management module 16, an integrated data model module 18 and a navigation and presentation module 20. The components, technologies and capabilities of the inventive application framework are comprised of various components grouped into the above-identified modules and are applicable across a wide spectrum of operations in multiple domains, including, but not limited to, command and control ("C2"), live exercise/maneuver planning and operations, situational awareness, decision support, human terrain mapping, etc.

The scenario and maneuvering module 12 includes a set of modeling and simulation components for geospatial and visual planning, design, preparation, execution, monitoring, tracking, evaluation and analysis of multiple-spectrum training and operational scenarios, events and maneuvers. The census and demographics module 14 includes various tools/toolsets for organizing and analyzing people and their relationships to one another, as well as organizations. The data management module 16 includes components for generally managing the flow, security access and exchange of data within and outside of the integrated data module 18. The integrated data model module 18 is a collection of loosely coupled data structures accompanied by system logic which manages the "ripple" effect of changes in data across the application framework. The navigation and presentation module 20 is an object-oriented collection of utilities for displaying information from the integrated data model module 18 in various views and providing a means for the user to easily navigate between those views.

Figure 2:
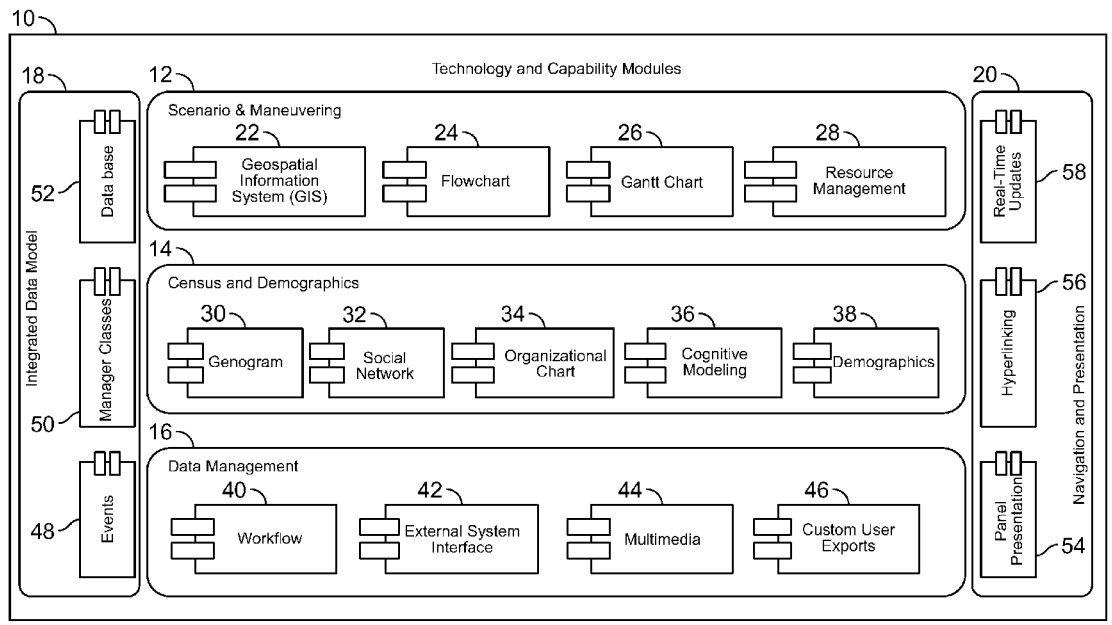
FIG. 2 is an expanded view of FIG. 1 illustrating the various components of the sub-modules of the application framework of the present invention.

FIG. 2 is an expanded view of the various modules of FIG. 1, illustrating the various sub-modules therein. As shown in FIG. 2, the scenario and maneuvering module 12 includes a geospatial information system ("GIS") sub-module 22, a flowchart sub-module 24, a Gantt chart sub-module 26 and a resource management sub-module 28. The GIS sub-module 22 is designed for spatial analysis and for creating cartographically appealing maps. The GIS sub-module 22 has the ability to perform standard and advanced GIS functions, such as, but not limited to: (a) unit positioning, maneuvering and movement planning and tracking using industry and military standard map imagery, symbols, icons and graphics; (b) viewing, editing and annotating maps and satellite imagery in various formats; and (c) GIS analyses (e.g., pattern and trend discovery, disturbed earth, etc.). The flowchart sub-module 24 is designed for creating cause and effect flowcharts. The flowchart sub-module 24 has the ability to create high or low level flowcharts to provide the requisite amount of detail in order to plan a scenario and/or record an actual scenario. These flowcharts may provide a causal chain of events and actions. Predefined scenario events and action types indicate the nature of the event and the person or group performing the event. Each flowchart event created by the flowchart sub-module 24 can be annotated with graphical and/or textual attributes to aid in visual modeling. The Gantt chart sub-module 26 is designed for managing time driven events. The Gantt chart sub-module 26 has the ability to manage both the time and duration of planned and actual scenario events for performing units and/or personnel. The resource management sub-module 28 is designed to allocate personnel and equipment to predefined scenario events. The resource management sub-module 28 has the ability to create resource categories which can be assigned to events along with a quantity (such as the number of units and/or personnel allocated to the event). Summary reports generated by the resource management sub-module 28 can provide decision makers with estimates of total utilization of resources for predefined scenario events.

The census and demographics module 14 includes a genogram sub-module 30, a social network sub-module 32, an organizational chart sub-module 34, a cognitive modeling sub-module 36 and a demographics sub-module 38. The genogram sub-module 30 is designed for family relationships and link analysis. The genogram sub-module 30 has the ability to create and maintain a family and their relationships, including marriage and child relationships, across multiple generations. The social network sub-module 32 is designed for social relationships and link analysis. The social network sub-module 32 has the ability to create and maintain social relationships, such as, but not limited to, business, social, municipal, religious, criminal and terrorist relationships. These relationships may be displayed using various graphical layouts including, but not limited to, a circular layout, a hypertree layout, a table layout, etc. The organizational chart sub-module 34 is designed for the organization of relationships and link analysis. The organizational chart sub-module 34 has the ability to associate people with various organizational types (e.g., business, social, municipal, religious, criminal, terrorist, etc.), and model each organizational structure (e.g., superiors, subordinates, etc.). The cognitive modeling sub-module 36 is designed for cognitive attribute modeling and analysis. The cognitive modeling sub-module 36 has the ability to identify and record an individual's mental attributes, such as attitudes (e.g., pro-US, anti-US, neutral) and then perform an analysis, such as attitude propagation, across a population demographic. Based on certain positive or negative events occurring to an individual or a group, the cognitive modeling sub-module 36 will change their cognitive attributes. The inventive application framework will then "ripple" those changed effects on related people over their family and social relationships. The demographics sub-module 38 is designed for population characteristic analysis. The demographics sub-module 38 includes system logic which calculates the demographics for a selected population (e.g., town attitudes) in a specific geographical area and/or at a specific time.

The data management module 16 includes a workflow sub-module 40, an external system interface sub-module 42, a multimedia sub-module 44 and a custom user exports sub-module 46. The workflow sub-module 40 is designed for the routing and approval of actions and work products. The workflow sub-module 40 and has the ability to ensure that the creation of work products are routed to, reviewed by, and approved by appropriate personnel before being finalized, baselined and/or published. The workflow sub-module 40 has the further ability to manage and track sequence-driven events and/or events that occur in parallel. Such managing and tracking is accomplished through features such as, but not limited to, workflow configuration, security enforcement, business role enforcement, automatic execution of scheduled workflow events, generation of notifications, etc. The external system interface sub-module 42 is designed for communications with external systems. The external system interface sub-module 42 includes system logic that imports/exports, transforms and transports data allowing the inventive application framework to interact with external systems. The multimedia sub-module 44 is designed for managing multimedia content. The multimedia sub-module 44 has the ability to manage the association of multimedia data, such as, but not limited to, pictures, video clips, sound bites, and animation, to application framework objects (e.g., map elements, thread events, roles, etc.). The custom user exports sub-module 46 is designed for exporting work product. The custom user exports sub-module 46 has the ability to create user-defined templates for exporting data in various layouts to various formats, such as, but not limited to, Microsoft®, Power-Point®, Adobe PDF, etc.

The integrated data model module 18 includes an events sub-module 48, a manager classes sub-module 50 and a database sub-module 52. The events sub-module 48 is designed for propagating data changes and other events through the application framework 10. The events sub-module 48 is the central decoupling mechanism used for data propagation through the various application framework components and interfaces. Data changes spawn events which can be received by any plug-in, manager class or interface as needed in order to present updated data information to the users and/or attached applications. The manager classes sub-module 50 is the central interface to shared data and/or functionality. The manger classes sub-module 50 is designed as a central interface to extended functionality. For example, each panel in the application framework 10 has a manager classes component which exposes the panel's functionality to the application. The manger classes component in each panel compliments events by providing scopes for event processing to occur and reducing event processing time. The database sub-module 52 is designed for persistent, high-capacity shared data storage. Common to application framework-based applications is the need to store data and meta-data. The key to extending the application framework database is adding new concepts. A concept is any data type and associated meta-data that is managed by the application to meet the needs of the customized module or sub-module. As a general rule, any new concept should be designed to be compatible with previous concepts to enhance the overall functionality of the application framework.

The navigation and presentation module 20 includes a panel presentation sub-module 54, a hyperlinking sub-module 56 and a real-time updates sub-module 58. The panel presentation sub-module 54 is designed for user interface customization. The panel presentation sub-module 54 is a utility that enables users to select which user interface panels to display, and arrange the panels in a dockable frame to suit the user's particular data synchronization needs. An arrangement of panels can be saved by the user as a custom view, allowing the user to switch views to perform different tasks. For example, one view may contain a map and timeline for planning events, while another view may contain a list of people and/or roles and their associated genograms and social networking associations. The hyperlinking sub-module 56 is designed for data mining and linking. Associations between concepts occur often. For example, a person or rule may be placed on a map, assigned tasks at certain times in the Gantt chart sub-module 26, given family associations in the genogram sub-module 30, etc. When viewing any set of data for the person and/or role, certain data elements will refer to these associations. Users are able to use the hyperlinking sub-module 56 to activate hyperlinks from the associated data elements to change the focus of the application to the activated data element(s). The real-time updates sub-module 58 is designed for usability in team environments or for real-time scenario analysis. The real-time updates sub-module 58 allows changes to data in the application framework environment to "ripple" out through the application, its plug-ins and other connected applications, as well as through multiple instances of the application operated by multiple users working on the same data sets.

Figure 3:
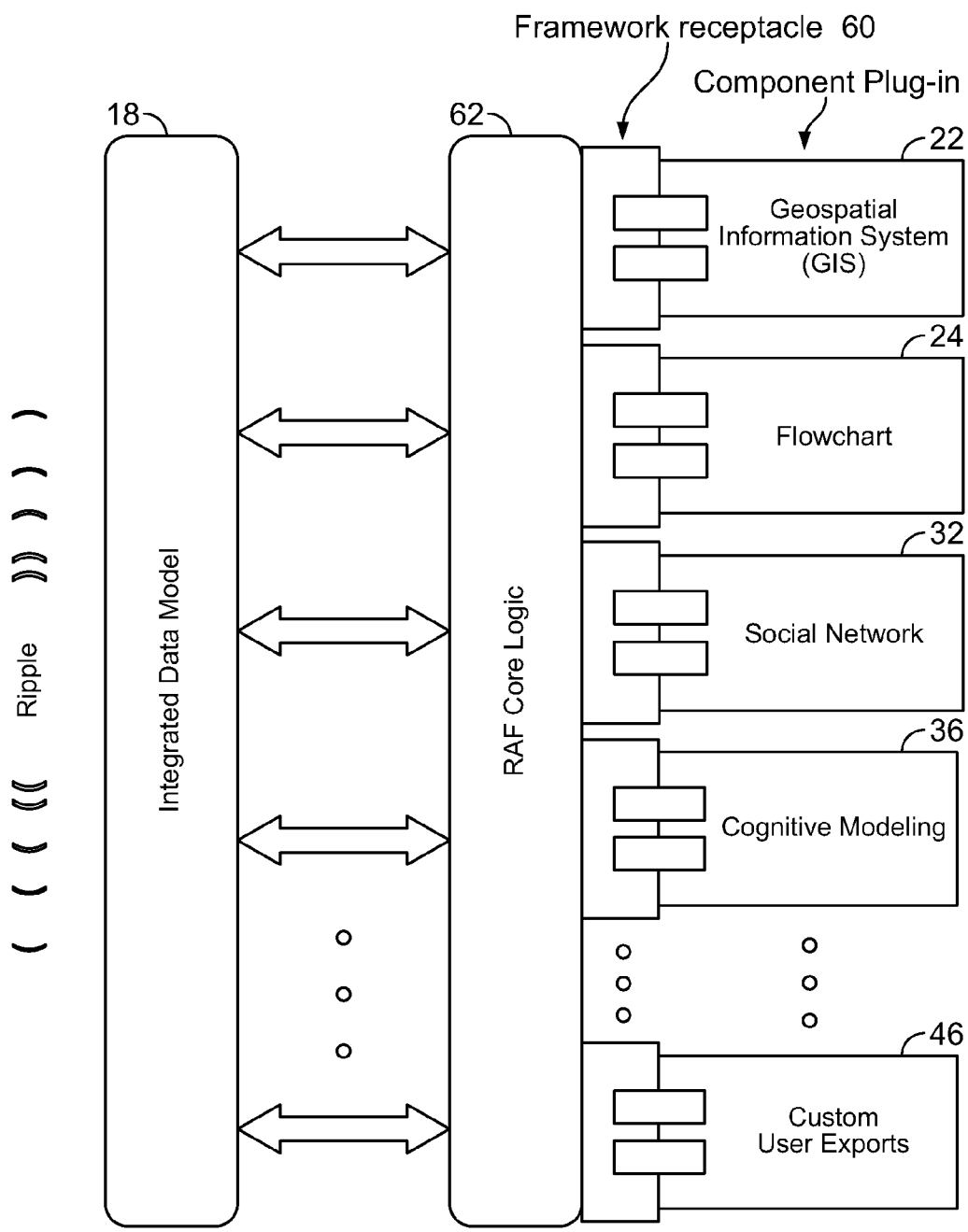
FIG. 3 is an architectural diagram illustrating the incorporation of the application framework of the present invention as a "plug-in" architecture.

FIG. 3 illustrates a further embodiment of the present invention. As shown in FIG. 3, in a further embodiment of the present invention, the inventive application framework 10 is designed as a plug-in architecture to better support the customization and extensibility of any system built using the inventive application framework. Customization is accomplished by enabling select application framework components which best suit a specific application's needs. Application extensibility, in a basic sense, is adding to the already existing application functionality. Both customization and extensibility are accomplished by the use of framework receptacles 60 and component plug-ins, or sub-modules. Framework receptacles 60 are extension points located in the core logic 62 of the application framework. New framework receptacle 60 can be added to the core logic 62 when a new component plug-in (e.g., sub-module) is developed. This allows new functionality to be added to the application with little or no interference of existing functionality.

The inventive application framework provides tools for creating a hierarchy of plug-ins. Each plug-in can extend to multiple extension points from the plug-in(s) that it directly depends upon. However, the application framework prevents two plug-ins from depending upon each other (i.e., a circular dependency), since this would signify a tight coupling between sub-modules and defeat the purpose of the inventive plug-in architecture. The application framework is generally designed to support three main types of extension points.

(1) Data Extension Point—A data extension point allows an extension to provide data only. For example, the core application 62 may need to acquire a list of directory names in which map files are located. Each customer may store map data in a different location, or at several different locations. Therefore, each customer can have a custom plug-in which extends the appropriate data extension point and provides a list of data directories, which are then gathered and used by the core application 62 when needed.

(2) Method Extension Point—All software developers are familiar with the basic pattern of abstraction provided by most programming languages, whereby a programming task is given a name, requires input and provides output. This structure is typically referred to as a function, or method. The method extension point provides a means for an application developer to extend an extension point by implementing a method and registering that method with the application framework for that particular extension point. When the method extension point is utilized, it receives input and can return a set of return values (i.e., outputs), one from each registered extension.

As an example, the core application 62 may create an empty "View" menu. The empty menu can then be passed as an input to a method extension point. A plug-in that provides map functionality may register a method as an extension to that method extension point. Thus, when the empty "View" menu is created, it will be passed as an input to the plug-in's method and the plug-in can modify the menu by, for example, adding menu items to the empty menu, such as "View Map", etc.

(3) Method-Chain Extension Point—Method-chains are an application framework concept that supports the building of complex task chains. Each task in the chain is a well defined task that runs on a particular type of process thread. Method-chain extension points, as used in the application framework, realize the following benefits:

A developer of a task is responsible for choosing the type of process thread that the task is designed to run on. Non application framework-based application development that relies on standard features of modern programming languages does not support the explicit assignment of a type of process thread to a piece of code by the software developer. This can permit code to execute on the wrong type of process thread and result in graphical user interface ("GUI") instability, data loss, application deadlocks, etc. The inventive method-chain extension points guard against this.

A developer of a task is responsible for explicitly indicating what task(s) the current task depends upon. Non application framework-based application development that relies on standard features of modern programming languages supports this too in a simplistic way by documenting the order of execution for tasks based upon the line code that the task execution is written on. For example, the task on line 9 typically executes after the task on line 8. The inventive application framework gives the developer the ability to designate the desired execution order of tasks irrespective of line code. For example, the task "display map with icons" can be designated to occur after the tasks "load icons" and "load map", while the tasks "load icons" and "load map" can be designated to be run simultaneously.

Since application developers designate the order of execution for tasks and the required thread types for execution, the control over application processor utilization can be abstracted. An application framework-based application that utilizes method chains can reliably scale to fully utilize additional CPUs without recompilation. As multi-core processors continue to add processing cores, application framework-based applications will continue to execute faster. Standard, single-threaded non application framework-based applications will not reliably realize performance gains from adding multiple processors, since the developer is typically not able to designate task dependencies.

Along with the above benefits from using method-chain extension points in general, method-chain extensions have the added benefit of creating implicit extension points before and after every task. For example, the core application 62 may create an empty "View" menu. The empty menu can then be passed as an input to a method-chain extension point. A plug-in that provides map functionality may register a method-chain task as an extension to that extension point, allowing it to add items to the menu, such as, but not limited to, "View Map", etc. If the "View Map" menu item needs to be added after, for example, a "View Layouts" menu item, the developer can specify that the "add View Map Menu Item" task depends upon the "add View Layouts Menu Item" task.

For example, provided below is the source code illustrating a sample plug-in XML showing extension point and extension registration for an exemplary RPF, in accordance with the present invention.

```
<plugin id="core">
    <requires>
        <import plugin-id="base"/>
        <import plugin-id="CTC_RAF"/>
    </requires>
    <extension-point id="Login.processLogin.successfullNormalLogin" extension-multiplicity="any"
        parent-plugin-id="base" parent-point-id="MethodChainExtensionPoint"/>
    <extension-point id="ApplicationInitialization.WindowsBinaryFiles" extension-multiplicity="any"
        parent-plugin-id="base" parent-point-id="ItemListExtensionPoint"/>
    <extension plugin-id="ripple" point-id="ApplicationInitialization.WindowsBinaryFiles">
        <parameter id="item" value="/jacob.dll"/>
        <parameter id="item" value="/mrsiddecode.exe"/>
    </extension>
    <extension plugin-id="CTC_JPF" point-id="InitApplication.startApplication">
        <parameter id="invoke-name" value="AppStartChain"/>
        <parameter id="xml"><value><![CDATA[
            <chain name="AppStartChain">
                <start name="LOAD_SYSTEM_PROPERTIES"/>
                <method name="LOAD_SYSTEM_PROPERTIES">
                    <chainable class="com.ctc.rbb.ApplicationInitialization" field="LOAD_SYSTEM_PROPERTIES_METHOD"/>
                </method>
                <method name="INIT_FILE_SYSTEM">
                    <chainable class="com.ctc.rbb.ApplicationInitialization" field="INIT_FILE_SYSTEM_METHOD"/>
                    <prev name="LOAD_SYSTEM_PROPERTIES"/>
                </method>
                <method name="INIT_DATABASE">
                    <chainable class="com.ctc.rbb.ApplicationInitialization" field="INIT_DATABASE_METHOD"/>
                    <prev name="LOAD_SYSTEM_PROPERTIES"/>
                </method>
            </chain>
        ]]></value></parameter>
    </extension>
</plugin>
```

The distinct advantages offered by the inventive application framework's unique extension framework are complimented by the application framework's event-based data management and propagation tools. Data management is performed through an object-oriented data-access-layer and event ontology which provides, but is not limited to, the following features:

Zero-maintenance object-oriented event management application programming interface ("API"), which, in turn, supports:
Inheritance-based event ontology.
Persistence/data-access layer integration.
Transaction demarcation.
Transaction logging.
Undo/Redo tagging and support.
Scope demarcation.
Listener priority and order.
Event veto.
Listener thread choice.
Serial, parallel or custom event listener order.
Cross-client support for handling events that cross machine or application boundaries via TCP/IP or shared databases.

Application framework events provide a flexible mechanism for propagating data changes through the application framework itself. An event can be any object, and listeners can choose to handle the event by listening for the object type directly, or by listening for its parent type. For example, a "DataEvent" event might have three subtypes, such as: "ChangedDataEvent", "AddedDataEvent" and "DeletedDataEvent". A listener can listen for any of the three subtypes directly to receive only that subtype of event, or, if the listener needs notified of all of the events (subtypes), it can listen for the parent type (e.g., "DataEvent").

A special persistence task is included with the application framework and is responsible for various tasks. These include, but are not limited to: (a) capturing changes to persisted data; (b) caching values that are updated for performance and rollback needs; (c) queuing the transaction until a commit is signaled; and (d) creating the undue transaction, as needed, by building a ready-to-run reverse transaction) (i.e., adds become deletes, etc.).

While application framework events meet much of the decoupling needs of the application framework and allow data changes to propagate to many application framework components, decoupling is also performed through the use of classes that have been termed "managers". Manager classes are a focal point for application functionality and/or features. There is often one or more managers per plug-in, with the managers providing the interface through which the application communicates to the plug-in. One way in which a manager provides loose coupling is through the central storage of shared data. For example, if multiple modules or sub-modules need to access the same piece of data, such as the logged-in username, the data would be stored in a manager to reduce memory footprint and improve application performance. The manager class would then be responsible for the implementation of listeners that receive notification of changes to the cached data.

Manager classes may also extend into parent classes provided by the core application in order to provide advanced functionality. For example, a plug-in may need to present a new panel for the user to display within the application. To do this, the plug-in would extend the base class for panels and implement all necessary methods to define the behavior of the panel. This manager class would then expose itself to the application framework as a "manager", and by its "manager" type allows the application framework to use it appropriately. Listeners implemented within the new manager class allow it to receive notification of changes to application data that the listener cares about, and integrate those changes seamlessly into the application framework environment.

Figure 4:
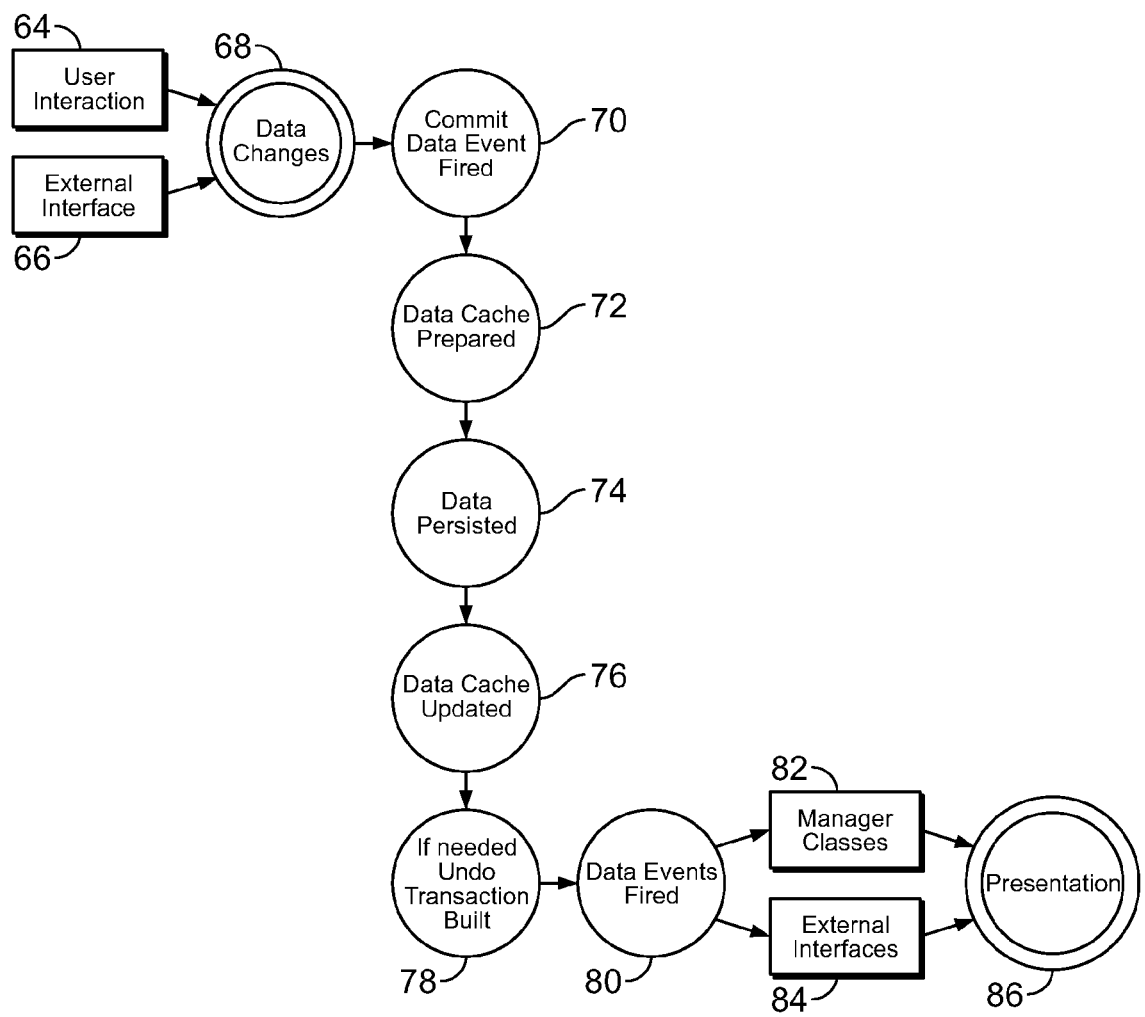
FIG. 4 is a flowchart illustrating how changes to application data are integrated seamlessly into the inventive application framework environment.

FIG. 4 depicts the process in action. As shown in FIG. 4, the user interaction 64 and external interface 66 blocks comprise all of the ways that a user or automated system process can modify data through the inventive application framework. This "front-end" piece is always customized per the needs of the customer. The "back-end" portion of a data change in the application framework (block 68) does not change, thus providing a consistent mechanism for performing a data change that utilizes the inventive application framework's full capabilities.

When a data change occurs, the application framework begins a sequence of actions to both persist that change and propagate it as required. First, at block 70, an event is fired to notify the framework that a data change is occurring. Then, a three-step process begins which prepares a transaction to modify the data cache (block 72), persists the transaction to a relational database (block 74), and finalizes the change to the local data cache (block 76). Once the data is persisted, the transaction may be converted to an appropriate "undo" transaction, at block 78. This transaction would thus enable the user to undo a change made through, for example, the GUI.

After the data is persisted, the application framework must propagate the change through all of the attached modules and sub-modules. This is done by initiating an event, at block 80, which explains the change to the attached extensions and listeners. These exist in the manager classes for plug-ins (block 82) and external plug-in interfaces (block 84). It is then the responsibility of these customized "front-end" modules to present the changes to the user or external interfaces as defined by the customer, at block 86.

FIGS. 5-8 illustrate object modules in the Unified Modeling Language ("UML") representing the design details for the application framework plug-in architecture.

Figure 5A:
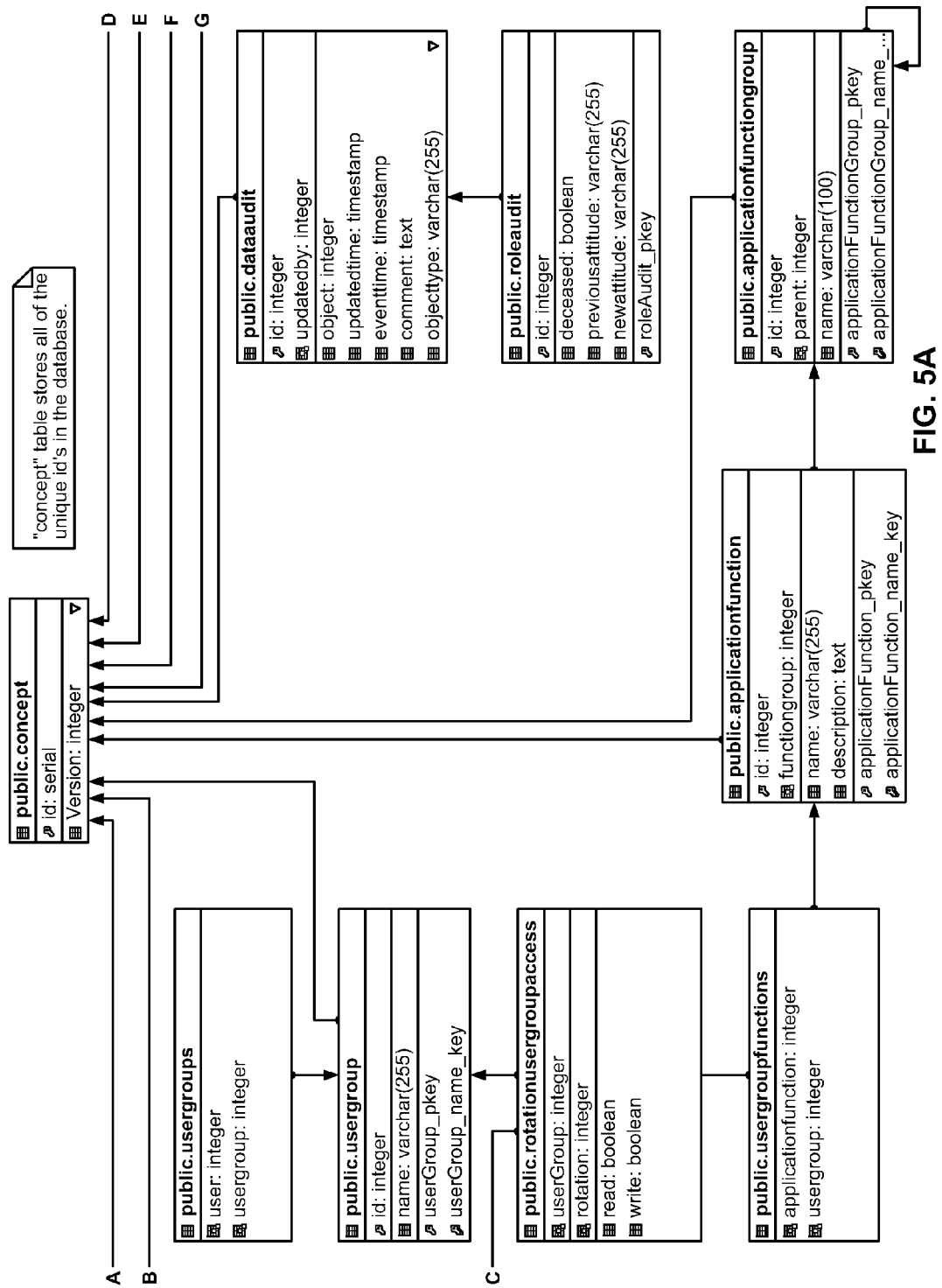
FIG. 5 (5A-C) shows a Unified Modeling Language ("UML") class diagram which illustrates how multiple data concepts are treated as a single "concept" type, allowing data to be propagated through the application framework with no changes to the core framework. A concept is any data type and associated meta-data that is managed by the application framework to meet the needs of the customized module or sub-module)
Figure 5B:
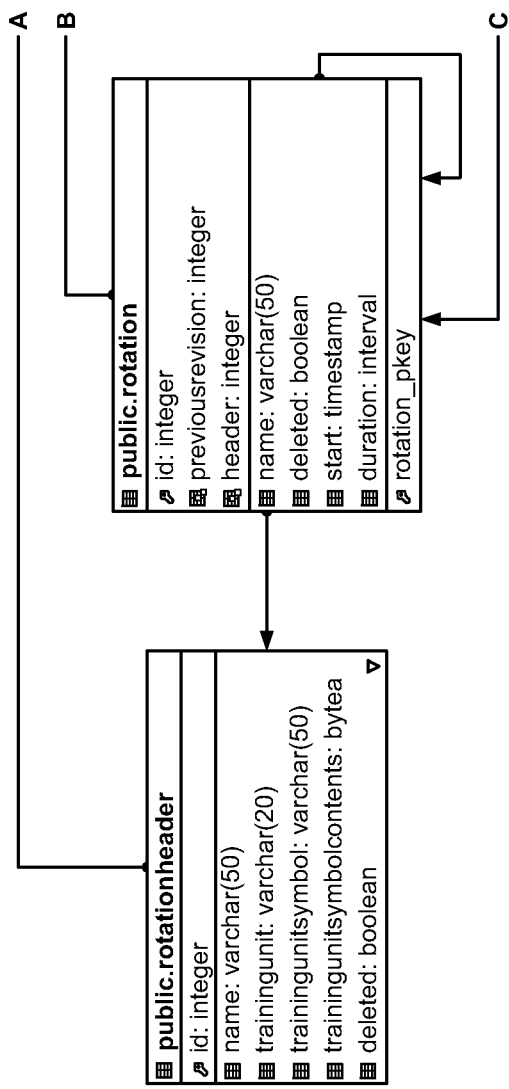
Figure 5C:
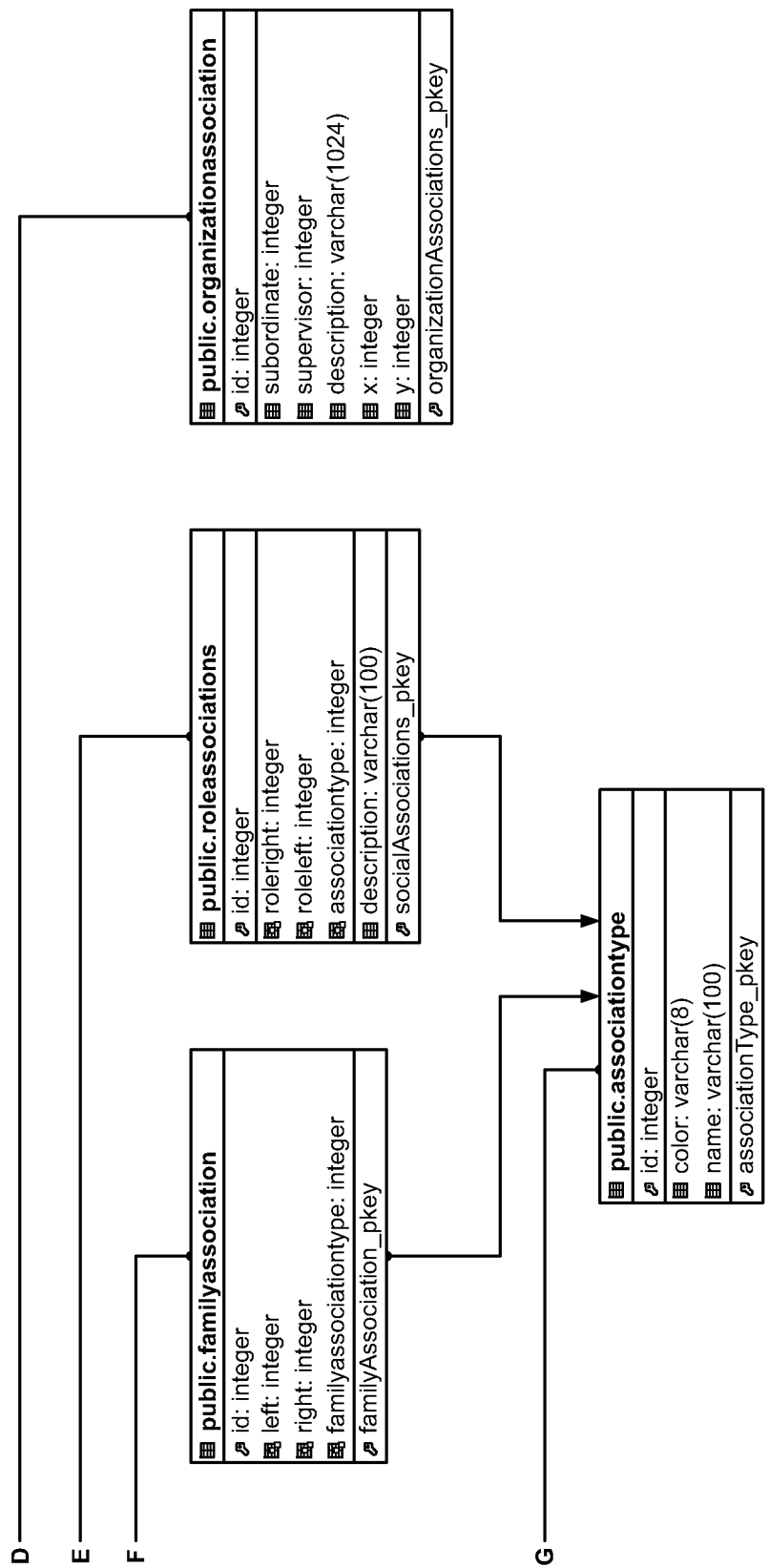

FIG. 5 shows a Unified Modeling Language ("UML") class diagram which illustrates how multiple data concepts (i.e., classes) are treated as a single "concept" type, allowing data to be propagated through the application framework with no changes to the core framework. A concept is any data type and associated meta-data that is managed by the application to meet the needs of the customized module or sub-module.

Figure 6A:
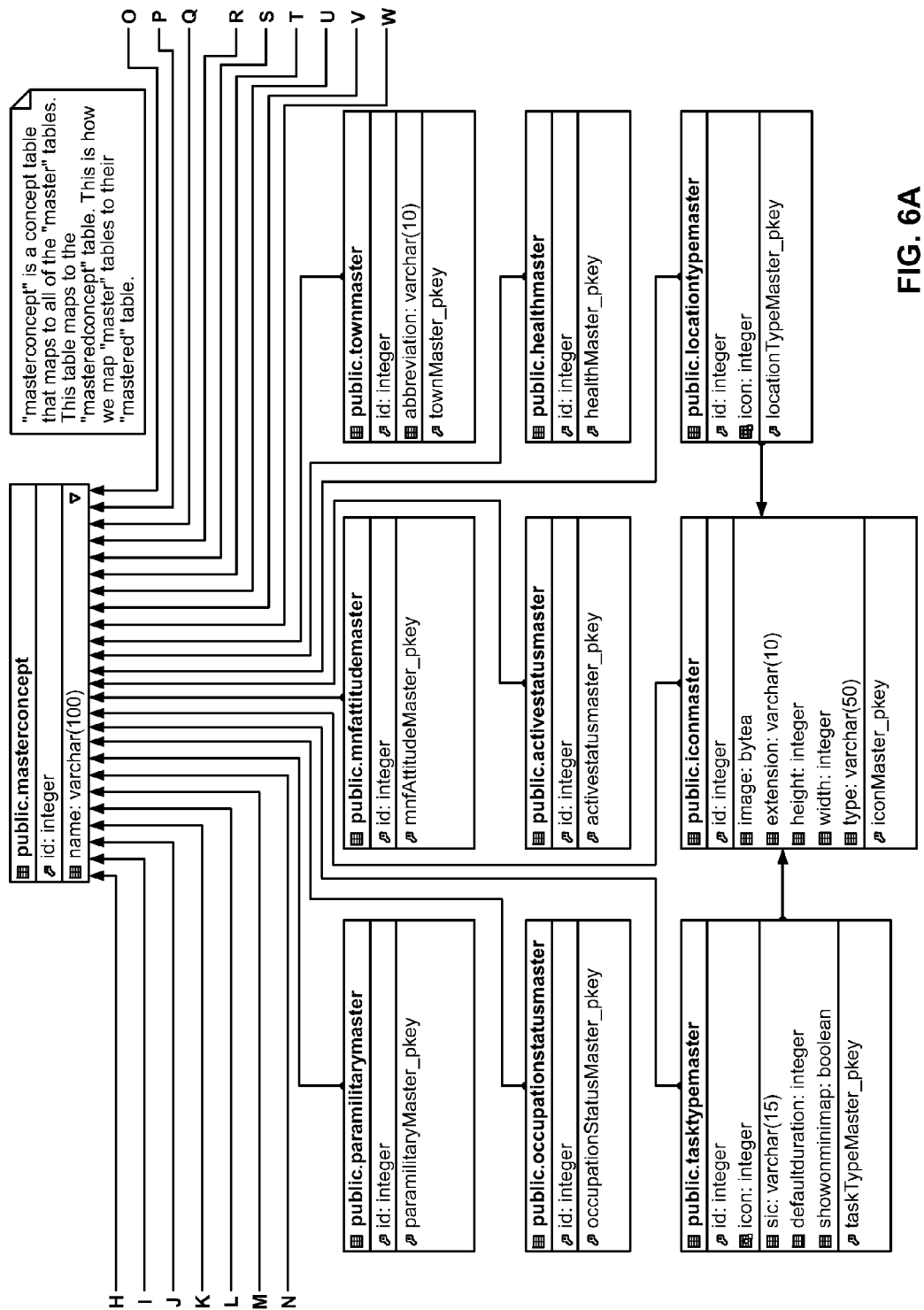
FIG. 6 (6A-C) shows a Unified Modeling Language ("UML") class diagram which illustrates several "master" concepts. Master concepts are concepts which are used to organize other data. For example, many master concepts group other concepts by demographic associations. By elevating what would otherwise be called "lookup tables" to first-class concepts, the application framework is able to provide powerful associative modeling and reporting.
Figure 6B:
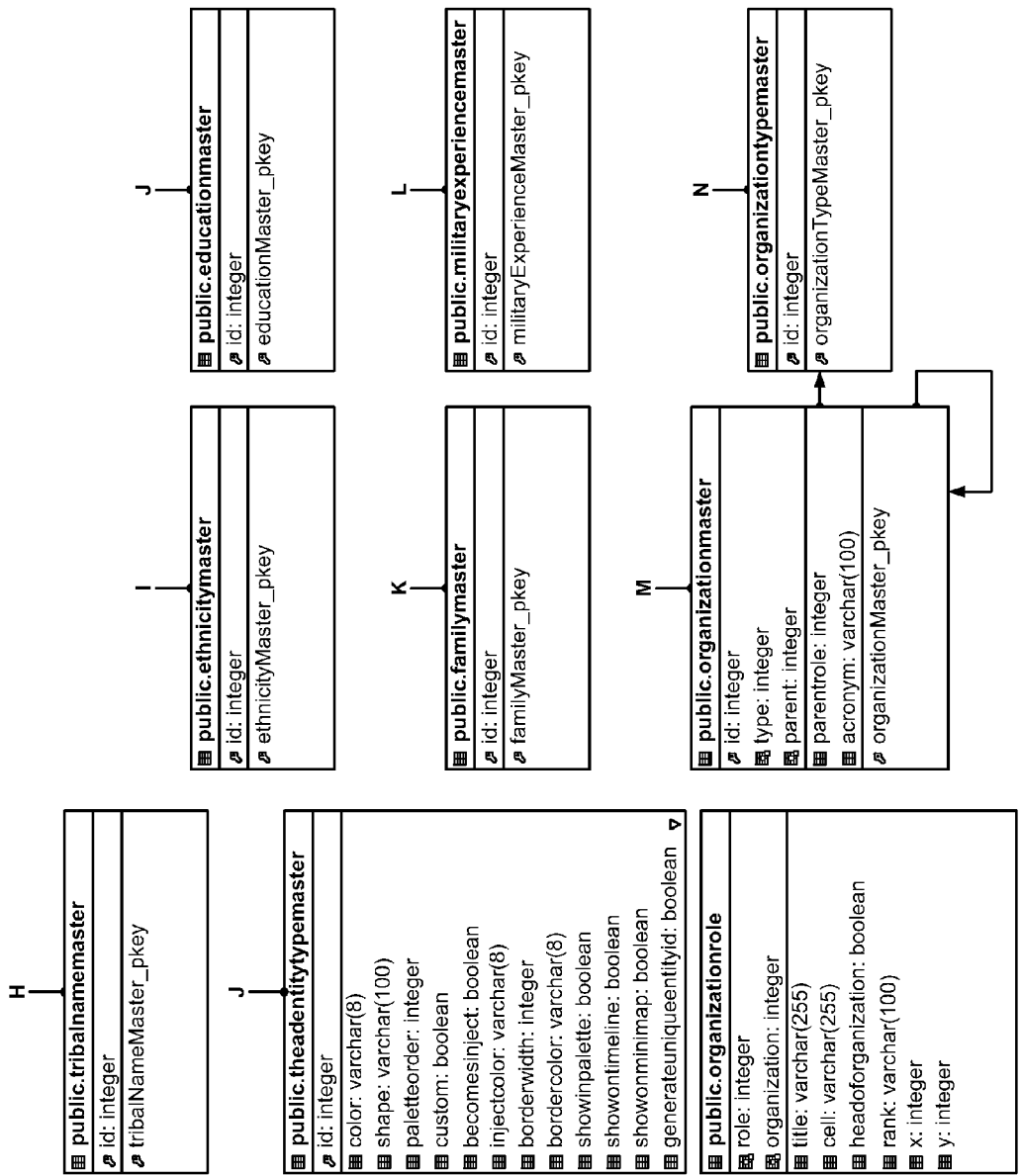
Figure 6C:
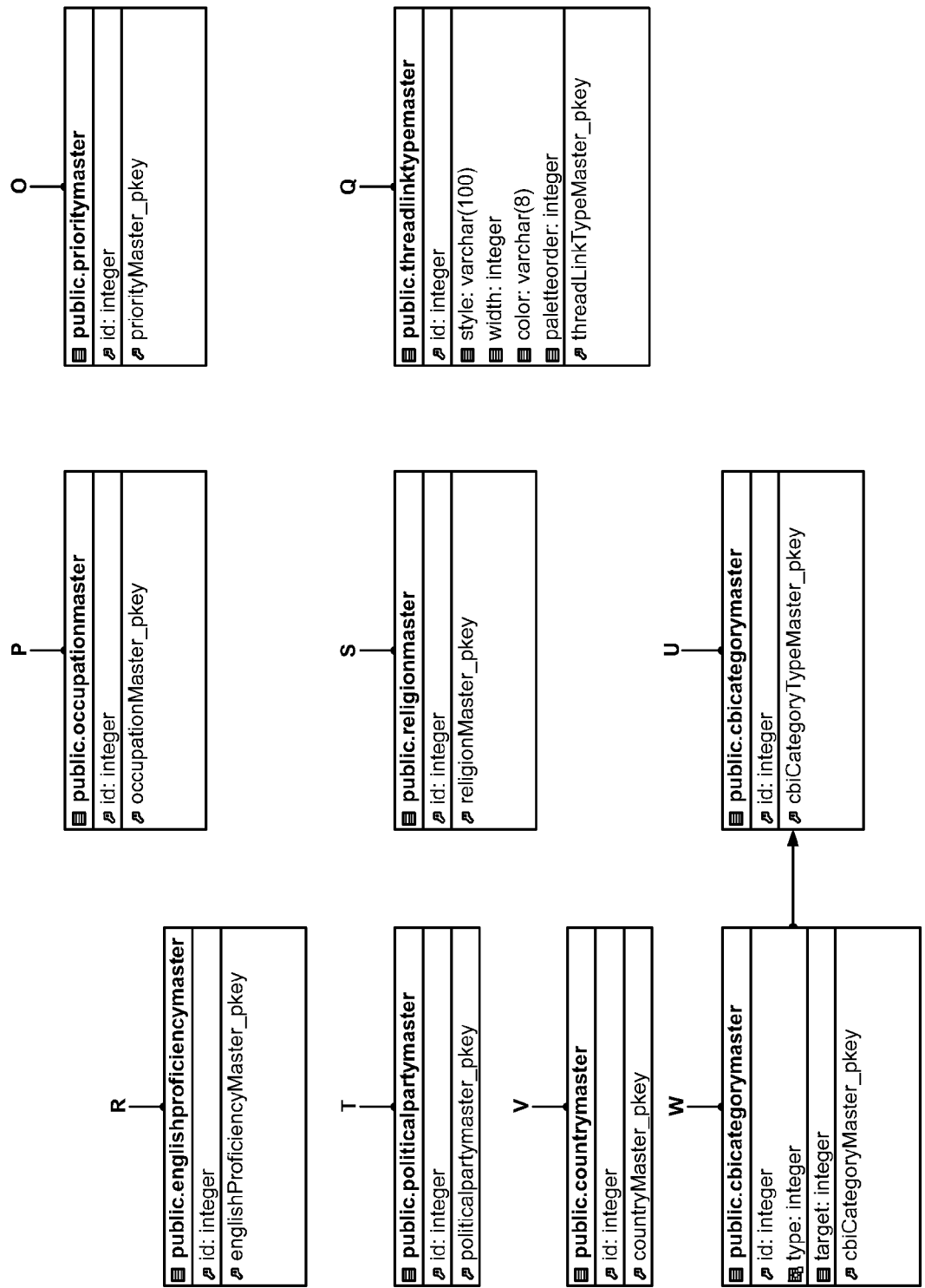

FIG. 6 shows a Unified Modeling Language ("UML") class diagram which illustrates several "master" concepts. Master concepts are concepts which are used to organize other data. For example, many master concepts group other concepts by demographic associations. By elevating what would otherwise be called "lookup tables" to first-class concepts, the inventive application framework is able to provide powerful associative modeling and reporting.

Figure 7A:
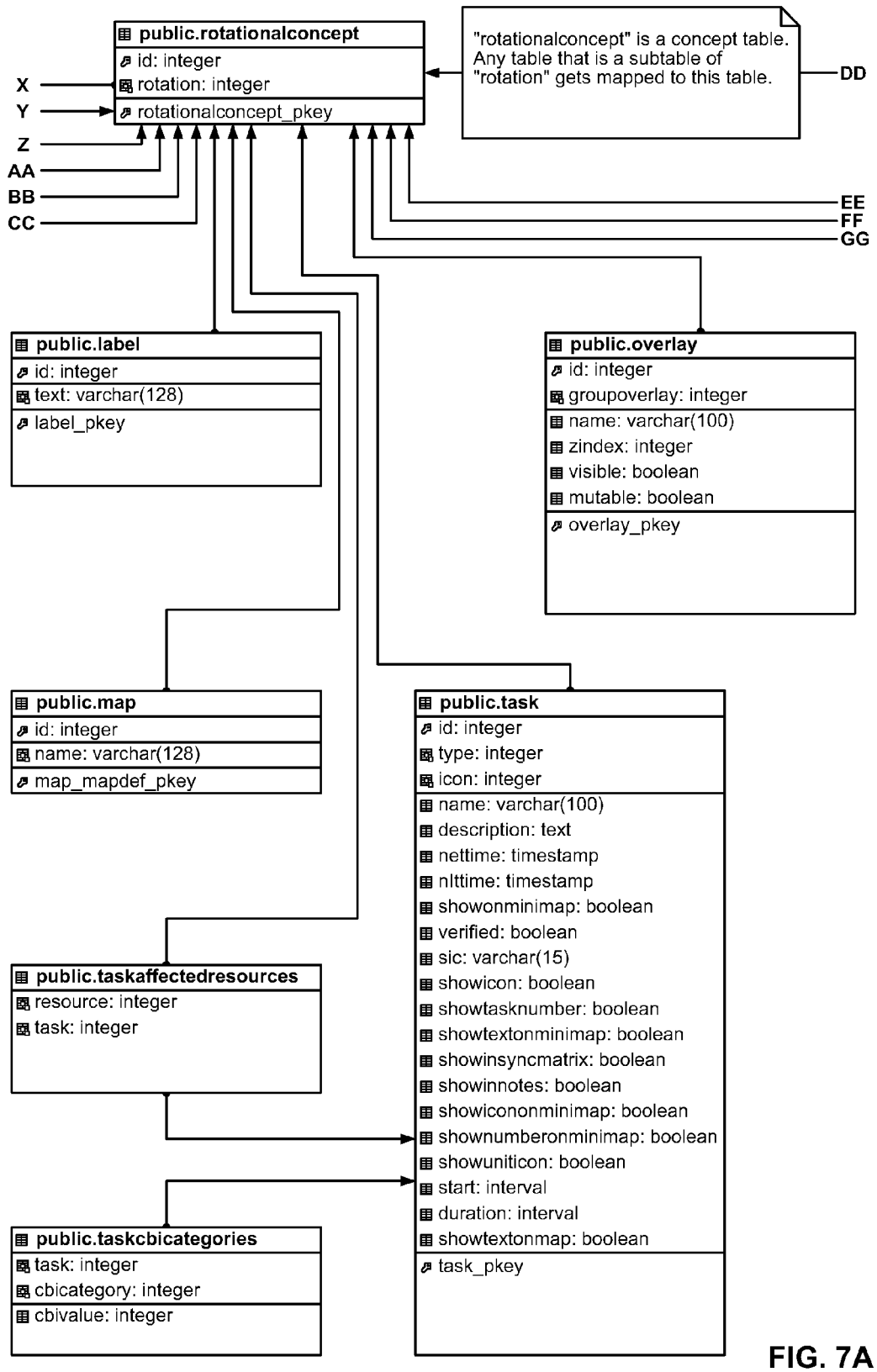
FIG. 7 (7A-C) shows a Unified Modeling Language ("UML") class diagram which illustrates several "rotational" concepts. Rotational concepts are concepts that have been identified as transient in nature. These concepts exist only in the scope of a particular association and cannot be accessed outside that scope. For example, a particular operation may only be available for a particular time period. By improving what would otherwise be a simple association to include the notion of transience, entire association trees can be copied, locked, deleted and modified as needed with appropriate security considerations.
Figure 7B:
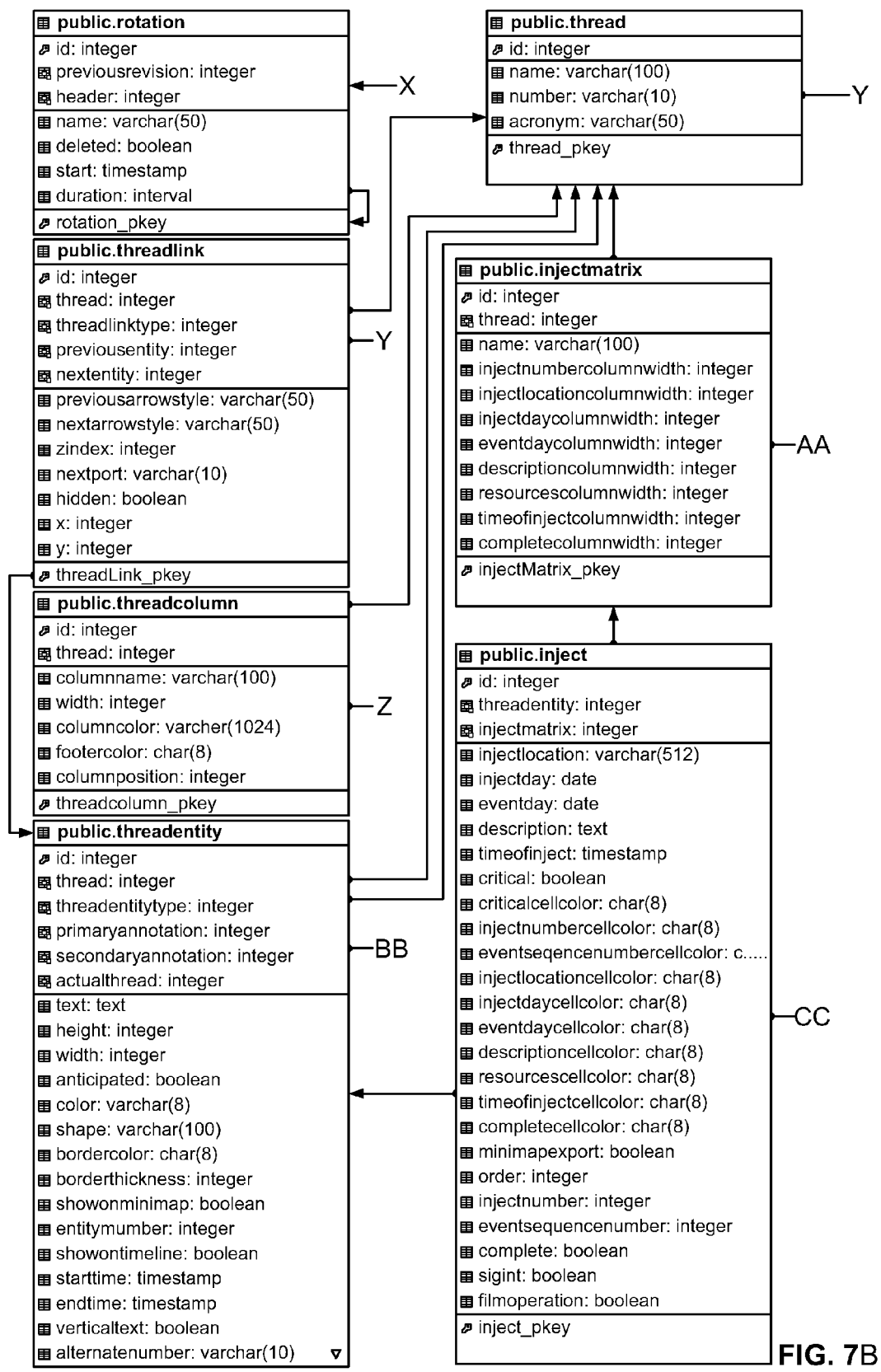
Figure 7C:
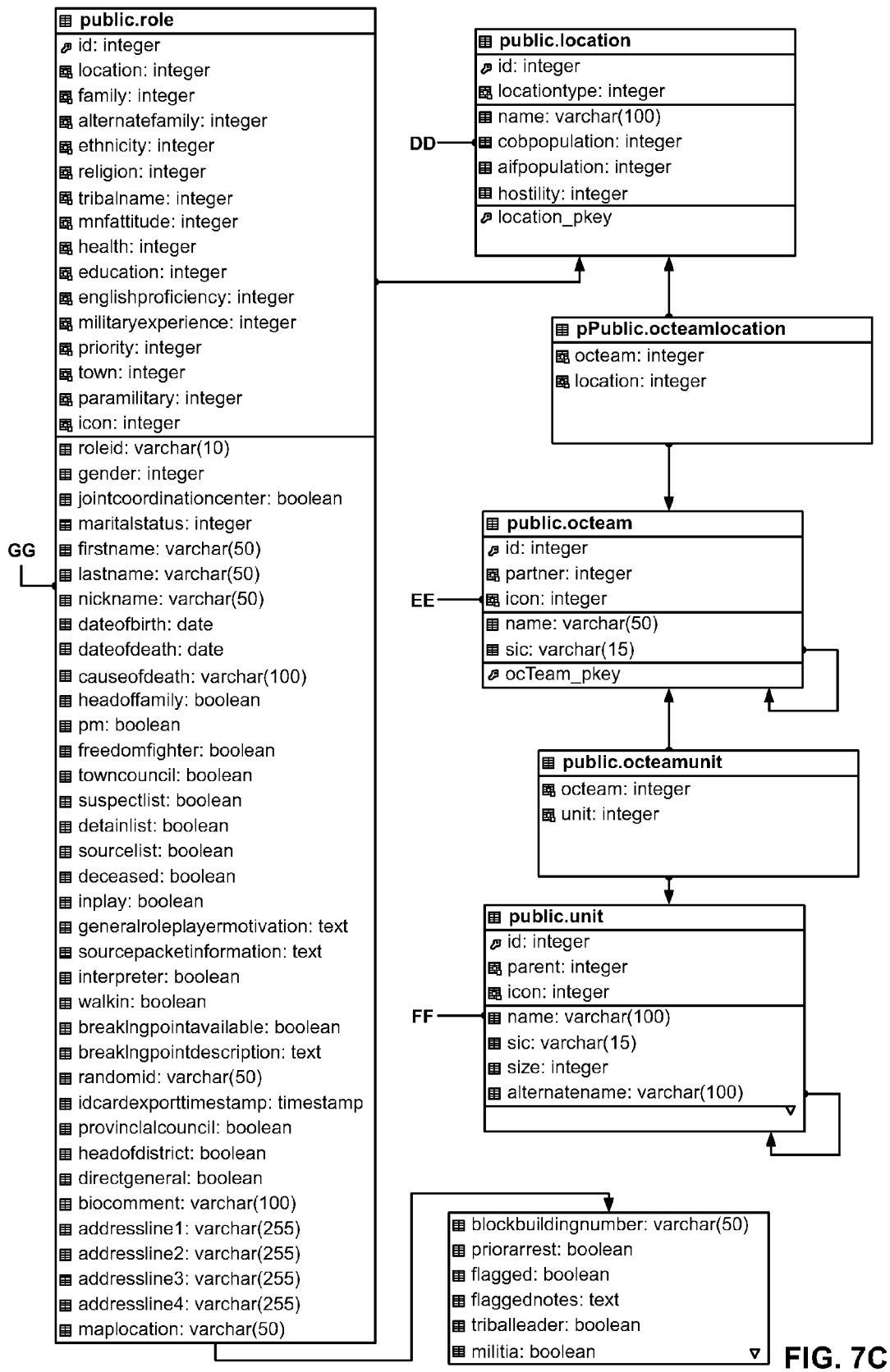

FIG. 7 shows a Unified Modeling Language ("UML") class diagram which illustrates several "rotational" concepts. Rotational concepts are concepts that have been identified as transient in nature. These concepts exist only in the scope of a particular association and cannot be accessed outside that scope. For example, a particular detailed training plan may only be available for a particular training period. By improving what would otherwise be a simple association to include the notion of transience, entire rotations can be copied, locked, deleted and modified as needed with appropriate security considerations.

Figure 8A:
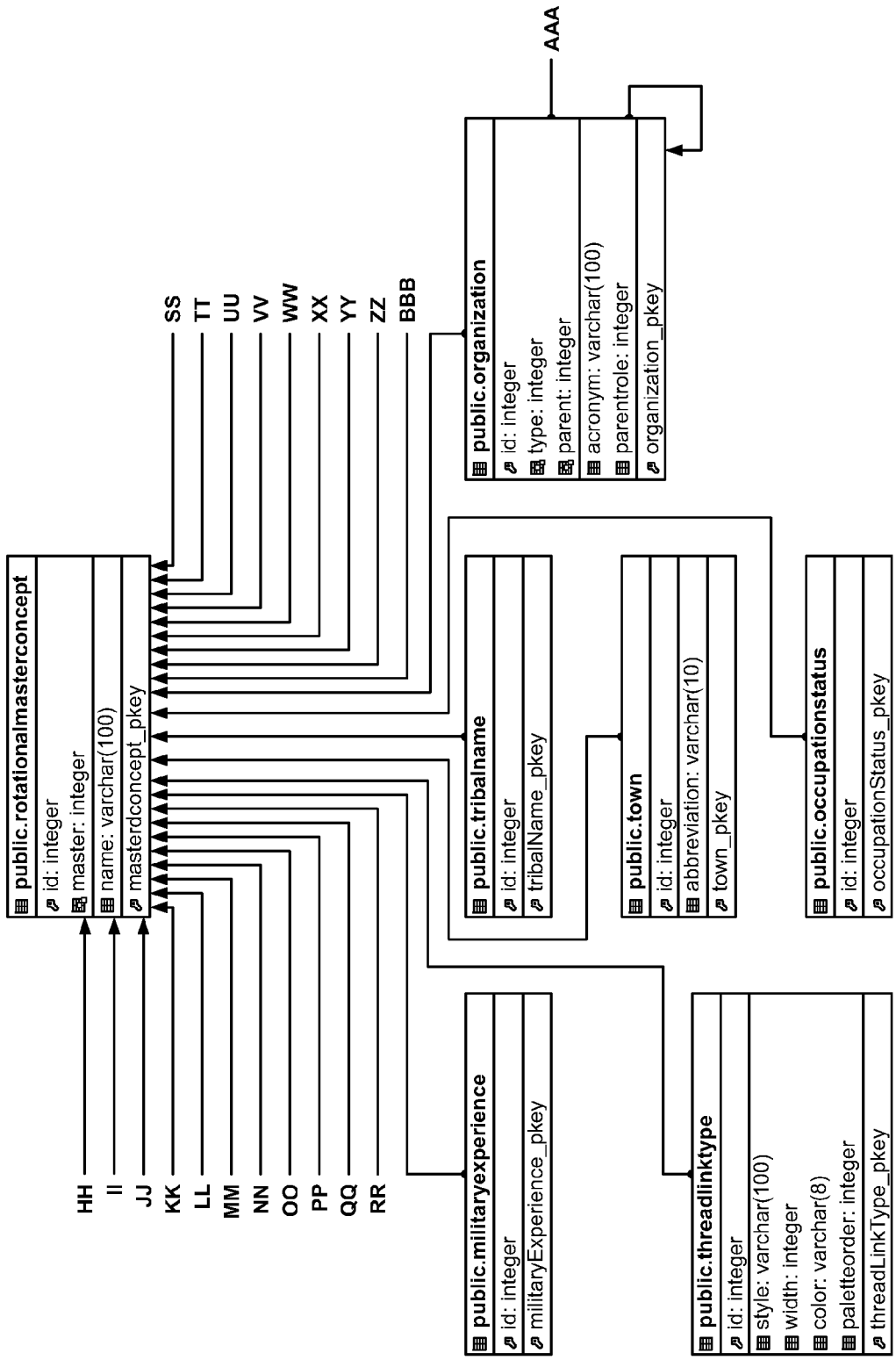
FIG. 8 (8A-C) shows a Unified Modeling Language ("UML") class diagram which illustrates several "rotational master" concepts. Rotational master concepts are concepts which are bound to a particular association (e.g., rotational)
Figure 8B:
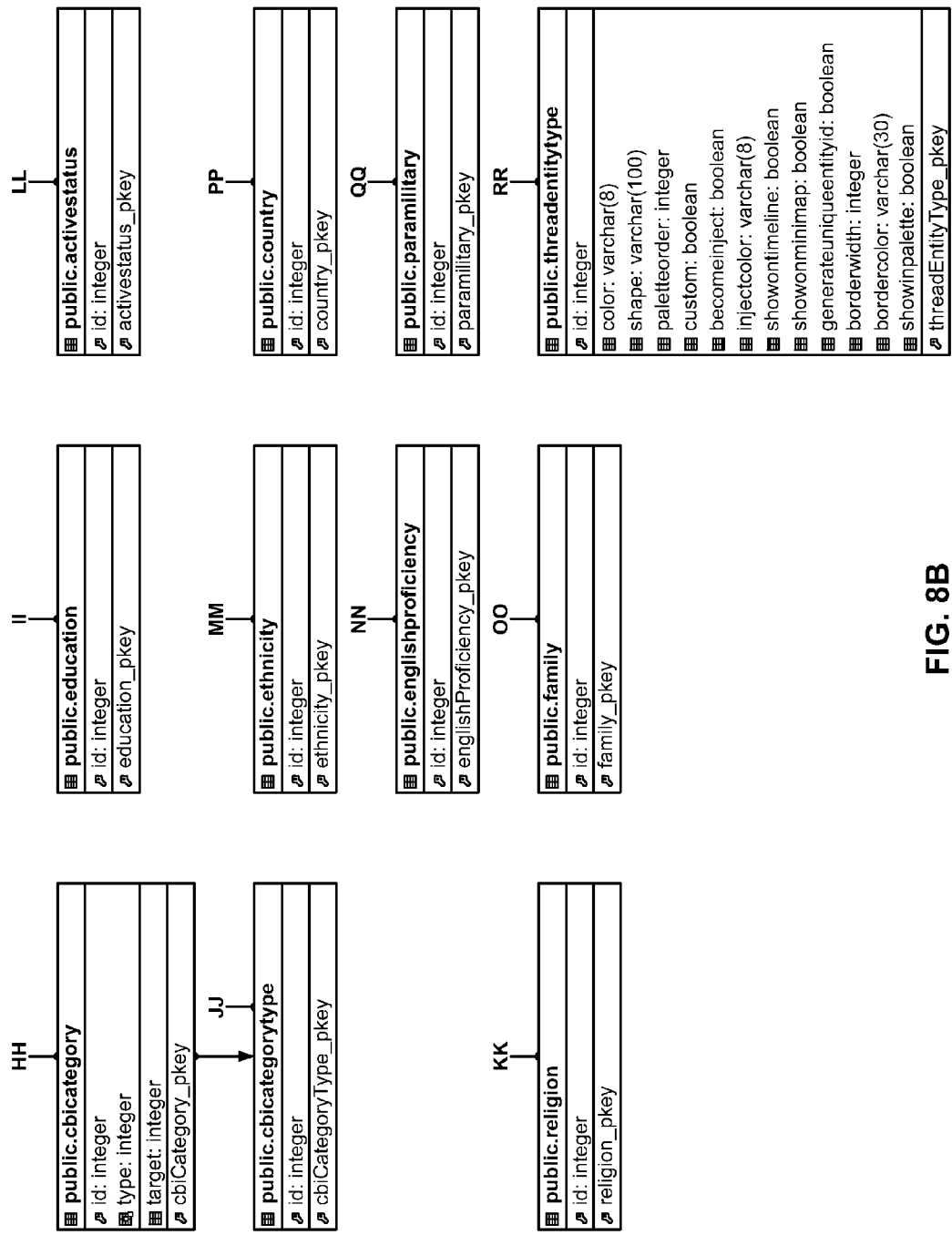
Figure 8C:
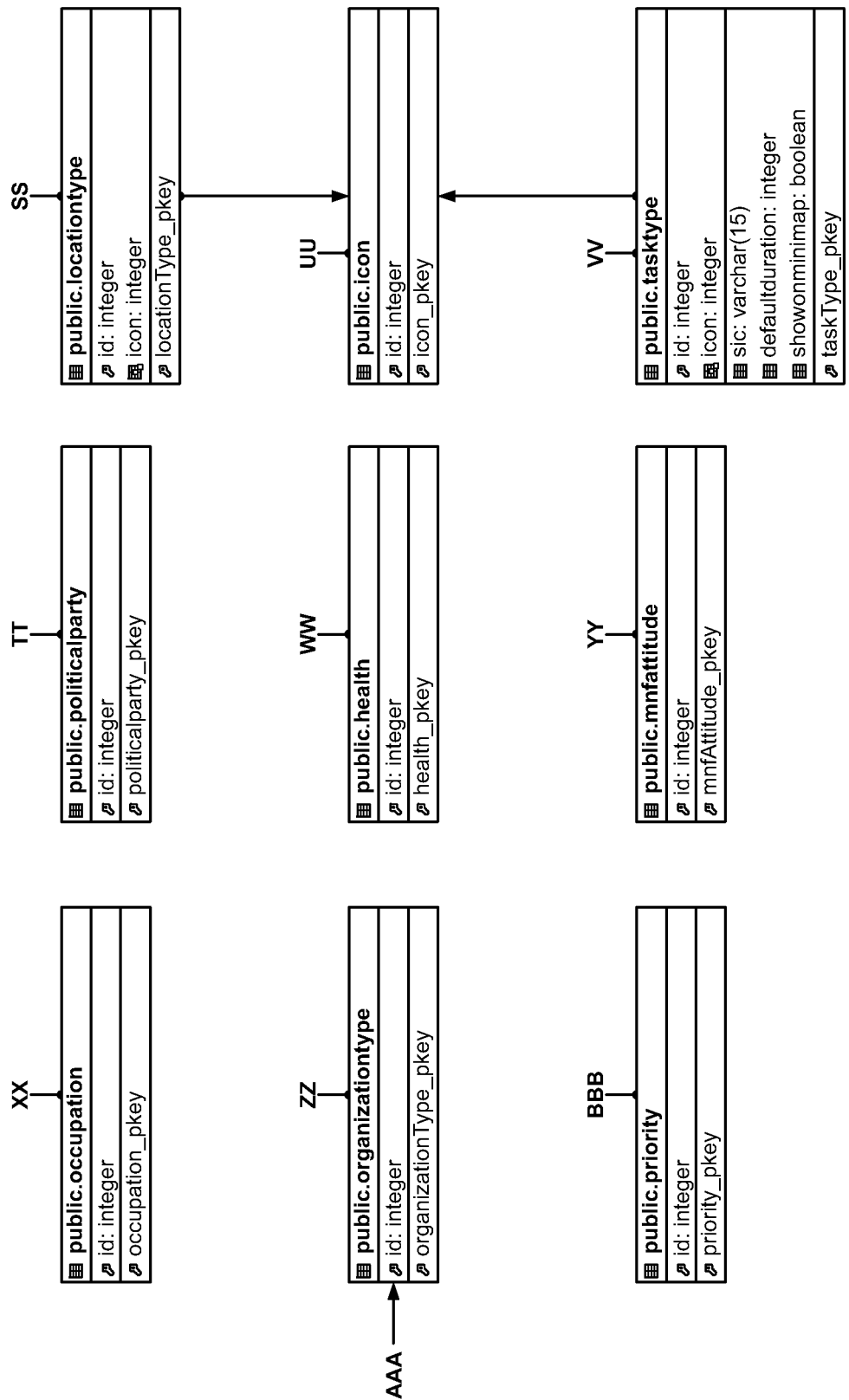

FIG. 8 shows a Unified Modeling Language ("UML") class diagram which illustrates several "rotational master" concepts. Rotational master concepts are concepts which are bound to a particular association (e.g., rotational) and also used to organize other data within that association (e.g., master). The inventive application framework technique allows changes to be made to master concepts, such as demographic associations, within the context of a particular association, and prevents those changes from leaving the scope of that association.

The inventive application framework includes at least one computer device having at least one memory and at least one processing unit operatively connected to the at least one memory. The various modules and sub-modules may be stored on the at least one memory and are readable by the at least one processing unit. The at least one processing unit executes a program(s) tangibly embodied on a computer-readable medium to perform the various functions of the inventive application framework and the modules and sub-modules thereof. When embodied as a plug-in architecture, each module and/or sub-module may have its own at processing unit and at least one memory for supporting programmability and operational functionality.

While the present invention has been described herein with particular reference to the drawings, it should be understood that various modifications could be made without departing from the spirit and scope of the present invention. Those skilled in the art will appreciate that various other modifications and alterations could be developed in light of the overall teachings of the disclosure. The presently preferred embodiments described herein are meant to be illustrative only and not limiting as to the scope of the invention, which is to be given the full breadth of the appended claims and any and all equivalents thereof.

We claim:

1. An application framework for computer-implemented development of custom software applications comprising:
   a computer device having at least one non-transitory data storage medium and at least one processor operatively connected thereto, the at least one processor executing functions programmed into the following modules and sub-modules:
      a scenario and maneuvering module configured for geospatial and visual planning, design, preparation, execution, monitoring, tracking, evaluation and analysis of multiple-spectrum training and operational scenarios, events and maneuvers, wherein the scenario and maneuvering module comprises:
         a geospatial information system sub-module configured for spatial analysis and for creating cartographically appealing maps;
         a flowchart sub-module configured for creating cause and effect flowcharts;
         a Gantt chart sub-module configured for managing time driven events; and
         a resource management sub-module configured for allocating personnel and equipment to predefined scenario events;
      a census and demographics module configured for organizing and analyzing people and their relationships to one another and organizations, wherein the census and demographics module comprises:
         a genogram sub-module configured for creating and maintaining family relationships and performing link analysis;
         a social network sub-module configured for creating and maintaining social relationships and performing link analysis;
         an organizational chart sub-module configured for organization of relationships and performing link analysis;
         a cognitive modeling sub-module configured for cognitive attribute modeling and analysis; and
         a demographics sub-module configured for population characteristic analysis;
      a data management module configured for managing the flow, security access and exchange of data within the application framework, wherein the data management module comprises:
         a workflow sub-module configured for routing and approval of actions and work products;
         an external system interface sub-module configured for communications with external systems;
         a multimedia sub-module configured for managing multimedia content; and
         a custom user exports sub-module configured for exporting work product in a plurality of formats;
      an integrated data model module configured for the effect of changes in data across the application framework, wherein the integrated data model module comprises:
         an events sub-module configured for propagating data changes and other events through the application framework;
         a manager classes sub-module configured as the central interface to shared data and/or functionality; and
         a database sub-module configured for persistent, high-capacity shared data storage; and
      a navigation and presentation module configured for displaying information from the integrated data model module in a plurality of views and providing navigation by a user between the plurality of views, wherein the navigation and presentation module comprises:
         a panel presentation sub-module configured for user interface customization;
         a hyperlinking sub-module configured for data mining and linking; and
         a real-time updates sub-module configured to allow changes to data in one module or sub-module to extend to other modules and sub-modules in the application framework.

2. The application framework of claim 1, wherein the sub-modules are configured for assembly into the application framework utilizing object-oriented techniques.

3. The application framework of claim 1, wherein the application framework is designed as a plug-in architecture, and wherein the sub-modules comprise component plug-ins receivable within receptacles connected to a core logic of the application framework.

* * * * *